(12) United States Patent
Gray et al.

(10) Patent No.: US 9,048,740 B2
(45) Date of Patent: *Jun. 2, 2015

(54) VARIABLE DUTY CYCLE SWITCHING WITH IMPOSED DELAY

(71) Applicant: SunPower Corporation, San Jose, CA (US)

(72) Inventors: Alexander Gray, Champaign, IL (US); Patrick L. Chapman, Austin, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/948,216

(22) Filed: Jul. 23, 2013

(65) Prior Publication Data

US 2013/0308345 A1   Nov. 21, 2013

Related U.S. Application Data

(63) Continuation of application No. 12/960,208, filed on Dec. 3, 2010, now Pat. No. 8,508,964.

(51) Int. Cl.
*H02M 7/5387* (2007.01)
*H02M 3/335* (2006.01)
*H02M 1/00* (2006.01)
*H02M 7/48* (2006.01)

(52) U.S. Cl.
CPC ...... *H02M 3/33507* (2013.01); *H02M 7/53875* (2013.01); *H02M 2001/0048* (2013.01); *H02M 2007/4815* (2013.01); *Y02B 70/1441* (2013.01); *Y02B 70/1491* (2013.01)

(58) Field of Classification Search
USPC ............................... 323/266; 363/17, 98, 132
See application file for complete search history.

(56) References Cited

U.S. PATENT DOCUMENTS

| | | | |
|---|---|---|---|
| 4,533,986 A * | 8/1985 | Jones | 363/17 |
| 4,686,615 A * | 8/1987 | Ferguson | 363/17 |
| 4,710,686 A | 12/1987 | Guzik | |
| 4,761,722 A * | 8/1988 | Pruitt | 363/17 |
| 5,115,386 A | 5/1992 | Shirahama et al. | |
| 5,450,306 A | 9/1995 | Garces et al. | |
| 5,781,418 A | 7/1998 | Chang et al. | |
| 5,805,438 A | 9/1998 | Takada et al. | |
| 6,317,339 B1 | 11/2001 | Shimazaki et al. | |
| 6,556,458 B2 | 4/2003 | Ohmura et al. | |
| 6,650,552 B2 * | 11/2003 | Takagi et al. | 363/17 |
| 6,678,177 B2 | 1/2004 | Asano et al. | |
| 7,440,300 B2 * | 10/2008 | Konishi et al. | 363/132 |
| 7,616,462 B2 | 11/2009 | Millnet et al. | |
| 8,218,338 B2 * | 7/2012 | Lin | 363/17 |
| 8,508,964 B2 * | 8/2013 | Gray et al. | 363/98 |

(Continued)

OTHER PUBLICATIONS

Search Report and Written Opinion PCT application PCT/US2011/050974 Mar. 12, 2012.

(Continued)

*Primary Examiner* — Jeffrey Sterrett
(74) *Attorney, Agent, or Firm* — Grasso PLLC; Fred Grasso

(57) ABSTRACT

Power conversion methods, systems, articles of manufacture, and devices are provided. The power conversion may include converting between direct current and alternating current wherein switching losses associated with latent electrical charges are reduced. Current sensing may be low-side bus reference. Solid-state implementations, code implementations, and mixed implementations are provided.

17 Claims, 9 Drawing Sheets

(56) References Cited

U.S. PATENT DOCUMENTS

2003/0193293 A1 10/2003 Hirschmann et al.
2009/0310390 A1 12/2009 Oshima et al.

OTHER PUBLICATIONS

Chapman et al., Design Optimization of a Biochemical harvesting Device, IEEE Power Electronics Specialists Conference, 2008, Jun. 15-19, 2008.

* cited by examiner

VARIABLE DUTY CYCLE SWITCHING WITH IMPOSED DELAY

This application claims priority to and is a continuation of U.S. application Ser. No. 12/960,208, which was filed on Dec. 3, 2010 and is entitled "Variable Duty Cycle Switching with Imposed Delay."

BACKGROUND

The present invention relates to solid-state power conversion and more specifically to solid-state switch management, feedback, and control.

An inverter is an electrical device that uses switches to convert direct current into alternating current. The switches open and close in a pattern to create a reciprocating current back and forth through a load. Conditioning and other circuit functionality can be applied to the resulting reciprocating current to change or manage its frequency, voltage, and size. Switches in inverters may be both mechanical and solid-state.

Devices performing the converse function of inverters are called rectifiers. Rectifiers function to convert an alternating current into a direct current. Like inverters, rectifiers may use switches that open and close in a pattern to create a single polarity current through a load. Also like inverters, rectifiers may be both mechanical and solid-state.

Solid-state inverters and rectifiers may use electronic switches, including FETs and MOSFETs, to convert direct current into alternating current or alternating current into direct current. Solid-state inverters may be employed to provide AC power from DC sources such as solar panels, batteries, and fuel cells while solid-state rectifiers may be used to convert alternating current from a power grid or AC generator into direct current for use to charge batteries, driving DC motors, or powering other DC current loads.

As with all power management systems, conversion losses in both inverters and rectifiers can serve to reduce the amount of power available after the power has been converted to a useable form. The smaller the quantity of the loss the more efficient the inverter or rectifier is considered to be. Power losses may be attributable to switching attributes, including the buildup of electric charge in a circuit, and the opposition to current an electric charge buildup may provide.

Switches in solid-state inverters can be positioned in a two-by-two configuration, commonly referred to as an H-bridge. In this configuration pairs of switches can fire to create alternating current through the load.

Embodiments provided herein are directed to, among other things, inverters, rectifiers, switch topologies for power conversion, current conditioning, voltage conditioning, current and voltage sensing, switch feedback, switch timing, and switch topology. Other embodiments may be plausible as well.

BRIEF SUMMARY

Embodiments may include processes, machines, and articles of manufacture. These embodiments may serve to provide switch operation having reduced switching losses or improved signal output, or both. Embodiments may include the use of upper and lower duty cycle boundaries to manage the operation and timing of switching operations. In embodiments, these duty cycle boundaries may be constants or variable and may be offset as well. Switching losses may be controlled or managed through the use of these duty cycle boundaries.

Embodiments may further include switch-side current sensing and logical current sensing for feedback control. Still further, embodiments may also include secondary global feedback control. These and other embodiments are described throughout and should be seen as exemplary and not limiting on the scope of invention.

Embodiments may include solid-state circuits having power train switches and diodes, sensor circuits configured to provide a sensor signal indicative of current flowing from the power train switches, and a logic circuit electrically coupled to the power train switching circuit, the logic circuit configured to send switching instructions for switching switches in the power train switching circuit. These switching instructions may include switching a pair of switches on and off, independently switching a third switch in the power train on and off, and holding open a fourth switch in the power train. In embodiments, the switches may have various configurations including MOSFET transistors, IGBT transistors, and other configurations as well. In embodiments the diodes may be included within the switches, as with MOSFET transistors, and may be separate as well, as with p-n junction diodes connected across IGBTs in an antiparallel configuration.

Embodiments may also include: a power converter having a switching type step-down converter circuit; having an input port to couple to a supply voltage; and having an output port to provide an output voltage at a magnitude that is lower than a magnitude of the supply voltage. The power converter may further contain a control circuit to receive a feedback signal and regulate the magnitude of the output voltage in response thereto, a switching type DC/AC converter circuit having a primary side and a secondary side, a rectifier circuit having an input port and an output port, the input port being coupled to the secondary side of the DC/AC converter circuit, and a feedback circuit to generate the feedback signal in response to the output port of the rectifier circuit.

Embodiments may also include converting direct current to alternating current. These embodiments may include generating a command signal representing a desired current, sensing an existing current in an H-bridge switch powertrain, comparing the command signal with the sensed current, and generating a first set of switching signals, the set including signals to alternately switch a first switch and a second switch in the H-bridge powertrain on and off, independently turn a third switch in the H-bridge powertrain on and off, and hold a fourth switch of the H-bridge powertrain open.

Embodiments may include converting alternating current to direct current. These conversions may include generating a command signal representing a desired current, sensing an existing current in a switch powertrain, comparing the command signal with the sensed current, and generating a first set of switching signals, the set including signals to alternately switch a first switch and a second switch in the powertrain on and off, independently turn a third switch in the powertrain on and off, and hold a fourth switch of the powertrain open.

According to aspects of embodiments of the invention, a power conversion may be provided. Embodiments may include: receiving a supply voltage and generating a first output voltage having a magnitude that is higher or lower than a magnitude of the supply voltage, where the act of generating comprises regulating the first output voltage in response to a feedback signal; generating an AC voltage from the first output voltage or generating a DC voltage from the first output voltage; rectifying the AC voltage to provide a DC voltage or inverting the DC voltage to provide an AC voltage; and generating a feedback signal in response to the generated voltage.

This invention and/or embodiments thereof will be further described and appreciated from the accompanying detailed description in conjunction with the accompanying drawings.

DETAILED DESCRIPTION

Figure 1:
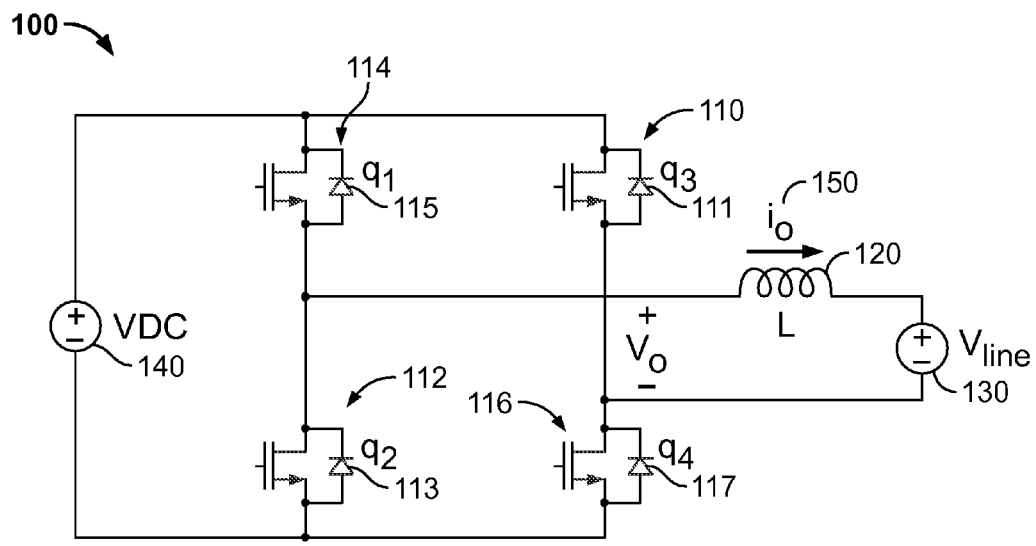
FIG. 1 shows and H-bridge switching topology of a power circuit as may be employed in accord with embodiments of the invention.

Embodiments of the invention may provide switching, sensing, or filtering techniques as may be employed by or for power conversion circuits. These can include the use of solid-state switching methodologies to control or assist switching management and timing, as well as to control or assist circuit feedback and sensing. Embodiments can include the use of software to control or assist switching management, switching timing, and circuit feedback and sensing.

These methodologies can include the introduction of fixed or variable duty-cycle boundaries to reduce or eliminate power loss associated with imperfect switching circuits. These methodologies can also include or employ feedback and filtering circuits to control currents or voltages between or around fixed and variable boundaries and to smooth output power signals from power conversion circuits.

Switch circuitry imperfections addressed in embodiments can include, but are not limited to reducing electrical charges, commonly called reverse recovery charges, which can serve to retard current flow. These reverse recovery charges may be formed or serve to impede current flow in p-n junction diodes, including those found in transistor body diodes as well as diodes used outside of transistors, but in conjunction with them. Different or additional sources and attributes of imperfect switch circuitry may also be addressed in embodiments. Still further, in certain embodiments, little or no measurable improvement to switch circuitry imperfections may be accomplished or perceived.

In embodiments, inverter switches may be fired in certain sequences and in certain groups. A result of these methodologies may provide for reduced MOSFET or other switch body diode recovery losses. These timing sequences may include having switches operate in critical conduction mode for prescribed periods of time and at times triggered by hysteresis type feedback and sensing.

Through the use of fixed or variable voltage boundaries, MOSFETs or other switches with antiparallel diodes may be timed and fired such that body diode losses or other diode losses associated with reverse current switching may be diminished if not eliminated. In other words, switch timing, switch methodologies, and switch topologies may be used that provide dead time for latent electrical charges in antiparallel diodes or other electrical charge impediment to dissipate before switches may be fired again and currents reversed.

Further to the above, embodiments may provide that current in a monitored powertrain be sensed directly from an inductive filter using a small resistance or shunt to produce a small voltage proportional to the current. This small voltage, which may be less than 50 mV, may be amplified to several volts in order to improve resolution and noise immunity. In embodiments, based on the difference in the measured current and a commanded current, a duty-cycle command may be produced. This duty-cycle command may be converted to switching signals that control switching MOSFETs in the power train. And, in embodiments, this command duty-cycle may adjust for or seek to reduce body-diode conduction loss problems through timing and delay firing methodologies. In so doing, variable and shifted boundaries serving to set the switch triggering signals may be used.

Still further, in embodiments, modified hysteresis control may also be used. In these embodiments, the sensed current may also be compared to a commanded current. If the sensed current exceeds the commanded current then the MOSFETs or other switches may be switched to redirect the current to decrease. Likewise, if the sensed current goes below the commanded current the MOSFETs or other switches may be switched to redirect the current increase. In so doing the actual current may oscillate back and forth around the commanded current.

Also, in these hysteresis embodiments, the sensed current may be compared to variable offset boundaries that serve to reduce switching losses associated with diode reverse recovery. Here, as well as in other embodiments, a reduction in switching losses may be realized by introducing a very short delay of dead time between the commutation of switches. This dead time may provide sufficient time for body diode conduction to dissipate, thereby reducing associated switching losses. Since current in the switches returns to zero or near zero in embodiments, the inverter may be considered to be a critical conduction mode inverter.

FIG. 1 shows a power train topology power circuit 100. Visible in the circuit of FIG. 1 are MOSFET switches 110, 112, 114, and 116, dc voltage source 140, inductor 120, inductor current 150, and output/line voltage 130. Also visible in FIG. 1 are body diodes 111, 113, 115, and 117. These body diodes are resident within MOSFET switches 110, 112, 114, and 116, but are explicitly shown to explain switching methodology of embodiments described herein.

In embodiments, including FIG. 1, a sensed current may be compared to a target current in order to control the switches of the power train of a circuit. When the sensed current exceeds the commanded current by some predetermined amount, the MOSFET switches 110, 112, 114, and 116 may be switched to redirect the current to decrease its flow. Likewise, if the sensed current goes below the commanded current by the predetermined amount, the MOSFET switches may be switched to redirect the current increase. In this way, the actual current oscillates back and forth around the commanded current.

In embodiments, this switching methodology may be further defined such that when $i_o$ 150 is positive, MOSFETs 114 and 112 may switch rapidly, MOSFET 111 may be off, and MOSFET 116 may be held on. More specifically, when MOSFET 114 is on, $i_o$ 150 may increase towards a threshold that is related to the desired output current of the power circuit 100. When this threshold is reached, MOSFET 114 may be turned off and MOSFET 112 may be turned on. Subsequent to this switching activity, there may also be a very short delay, designated as dead time or deadband between the commutation of the two switches 112 and 114. During this deadband time, the body diode of MOSFET 112 may turn on as the inductive current continues to flow. Once MOSFET 112 turns on, most or all of the current may flow through MOSFET 112 instead of its body diode 113. Also, once MOSFET 112 is on, the current $i_o$ 150 may decrease toward zero. At zero, there may be little if any current flowing in either MOSFET 112 or its body diode 113. In this way, switching loss experienced by either the MOSFET 112 or the body diode 113 may be reduced.

Conversely, when the current is flowing in the opposite direction, the timing and activity of the switches may be reversed. For example, MOSFETs 110 and 116 may switch rapidly while MOSFET 114 may be off and MOSFET 112 may be held on. Thus, when MOSFET 110 is on, $i_o$ 150 may move towards a threshold that is related to the desired output current of the inverter. When this threshold is reached, MOSFET 110 may be turned off and MOSFET 116 may be turned on.

By following this switching methodology, the current may reach zero each switching cycle. However the current may not dwell there for a significant or substantial amount of time.

While remaining at zero may serve to discharge MOSFET body diodes and reduce associated power losses, the output signal may become too distorted when zero lag times are too long. Likewise, when zero crossing times are too short, the output signal may contain less noise, but the power losses may be more significant. The use of variable duty-cycle boundaries may be used in embodiments when waveform integrity is desired. The startup noise may be generated when circuit components are settling in. Distortion, once the circuit is up and running, is not preferred as it can cause failure to meet standards or other problems.

The power train of FIG. 1, as well as other embodiments, may also include further filtering to smooth the output power. In a preferred embodiment, the frequency of the switching will be high such that smaller inductors may be used in "LCL" and other types of filters.

Figure 2:
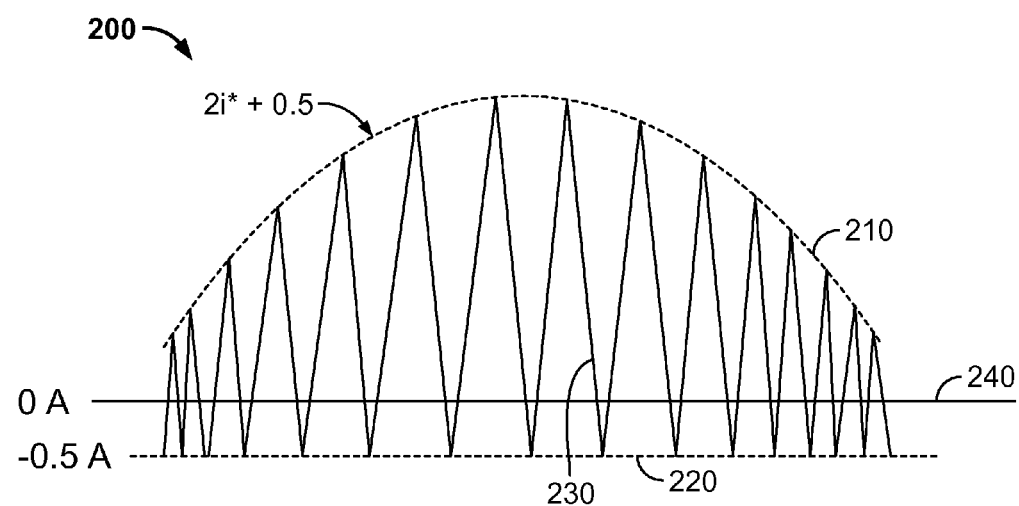
FIG. 2 shows an alternating current held between top and bottom duty-cycle boundaries as may be employed in accord with embodiments of the invention.

FIG. 2 shows duty-cycle boundaries as may be employed in embodiments. As can be seen the top duty-cycle boundary may be sinusoidal and the bottom duty-cycle boundary may be constant. In FIG. 2, the boundaries have been shifted by −0.5 A for the bottom boundary and by +0.5 A for the top boundary. The current generated from these boundaries may be approximately half of the distance between the boundaries. In this embodiment, as well as in others, the bottom boundary may be offset from the OA axis to reduce switching losses. When this offset is performed, the upper boundary may be offset by a similar amount to maintain power circuit output.

Figure 4:
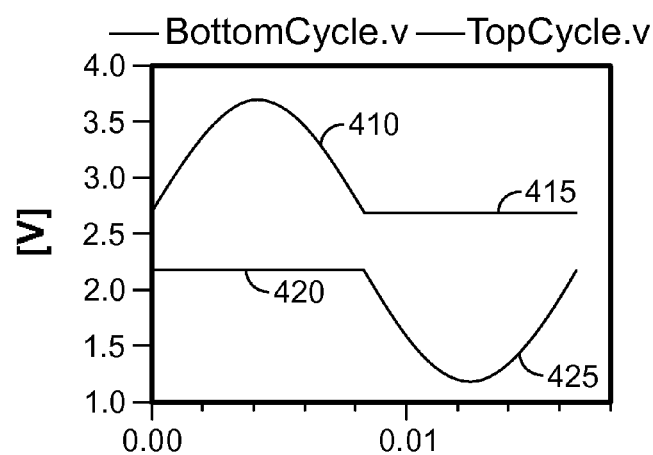
FIG. 4 shows top and bottom voltage boundaries for an approximate switching cycle as may be employed in accord with embodiments of the invention.

As can be seen in FIG. 2, with the offset, the top boundary 210 is defined by the curve 2i*+0.5 and the bottom boundary 220 is defined by the constant −0.5 A. The triangles within the boundaries represent thousands of oscillations of current through the inductors. These oscillations may be defined by numerous upper and lower boundary curves and boundary constants. The top boundary may be set so that that top value of the current is sinusoidal. The bottom boundary may be set such that it provides that the MOSFET body diodes have had adequate time to recover. In embodiments, as noted, the bottom boundary may be offset from zero amps such that adequate time for discharge of the MOSFET body diodes is provided. During time in which the current is negative, stored charge in the MOSFET body diodes may be dissipated. In a negative cycle, the boundaries may reverse, with the top boundary being a constant value, perhaps +0.5 amps and the bottom boundary being a sinusoidal and offset by −0.5 amps. FIG. 4 shows an example of this.

In embodiments, hysteresis control may be used to control commanded current. As noted, the upper bound may be allowed to vary with the commanded current while the lower bound may be fixed. As shown in FIG. 2, for a given cycle, the current may form a triangle from $i_l$ to $i_u$. For these triangles it can be shown that the average value of the current is $$\bar{i} = \frac{1}{2}(i_u + i_l)$$

where a preferred upper bound (assuming a fixed lower bound) may be set to $$i_u = 2\bar{i} - i_l$$

In embodiments the lower bound may be set to 0 A. In this instance, the upper bound may be twice the desired current. In other preferred embodiments, the lower bound may be set slightly below 0 A. By setting the bound below 0 A, a stored charge in the body diode may have time to dissipate before a top switch (e.g., MOSFET 114) is turned on. In preferred embodiments, some lower bound near and below 0 A may be preferred for minimizing overall loss when conduction, switching loss, and body-diode switching loss, are collectively considered.

Varying the boundaries under different circumstances may be preferred in other embodiments and exemplary boundary configurations are addressed in further detail below.

Figure 3:
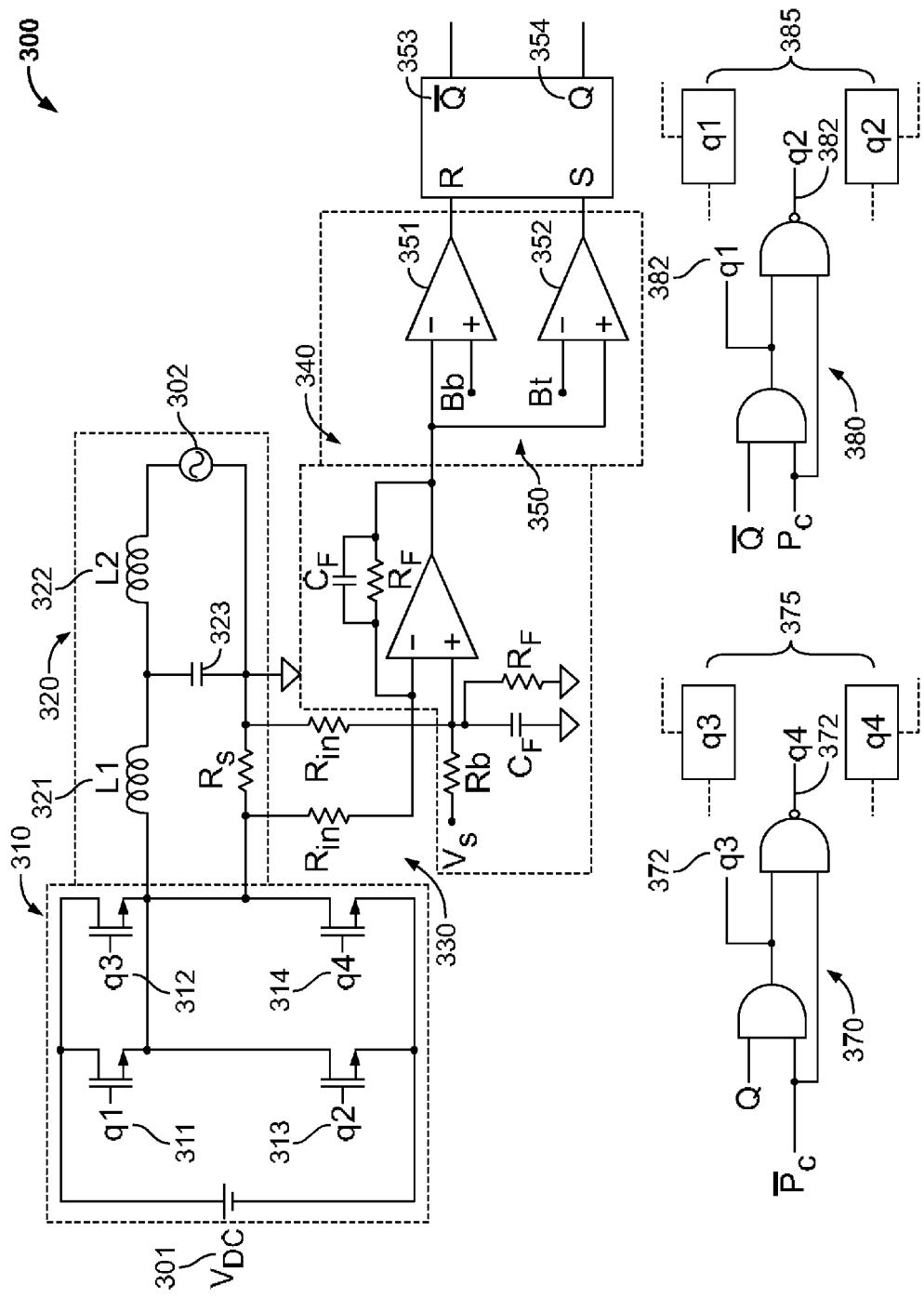
FIG. 3 shows power conversion circuitry including top and bottom boundary comparators as may be employed in accord with embodiments of the invention.

FIG. 3 illustrates an exemplary power converter with an H-bridge type topology. The timing of the switching events and the use of current sensing may employ embodiments. Likewise, the comparator inputs may exemplify the boundaries described herein and the related and prescribed diode discharges.

FIG. 3 shows a DC power supply 301 that incorporates a power converter circuit 300 in accordance with embodiments of the invention. The power converter circuit of FIG. 3 may be used by itself, as a power supply, or may be combined with one or more other circuits in forming other types of power supply circuits, for example, to provide an AC power supply 302. Furthermore, sections of the circuit 300 may also be used in rectifiers embodying the invention.

Circuit 300 can be considered to include several main elements: a DC power source 301, switches 310, a filter 320, a sensor circuit 330, a gain circuit 340, a comparator circuit 350, gate drives 375 and 385, and control circuitry consisting of, for example, a flip-flop 360 and command gates 370, 380. These main elements may be used to output the AC output voltage 302.

FIG. 3 shows the DC power source 301 connected to four power MOSFET switches 311-314 in an H-bridge configuration. These power MOSFETS include body diodes in antiparallel orientation. The body diodes are not explicitly illustrated in FIG. 3 but are shown above in FIG. 1. Inductors L1 321, L2 322 and capacitor C1 323 are also shown in FIG. 3. The inductors L1 and L2 and the capacitor C1 may serve to smooth the output of the four MOSFET switches, which is inherently rough. In other words, the inductors and capacitor may serve as a third-order filter that dampens the output of the power MOSFETs into a smoother sine waveform. This smoother sine waveform may be fed to the alternating current voltage source 302. This voltage source 302 may be considered to be an AC voltage to the power grid.

In embodiments, the MOSFETS in FIG. 3 may be opened and closed in a pattern such that they serve as a pulse-width modulated bridge. In operation, depending upon the positions of the MOSFETS, the bridge may be producing one of three outputs: positive direct current, negative direct current, and zero direct current. The speed with which the MOSFETS are opened and closed may be increased in certain embodiments such that the size of the inductors may be preferably minimized or reduced.

Brief periods may exist where two switches are both carrying the full current and blocking the full voltage causing a spike of power for, perhaps, nanoseconds. On average, these spikes add up to a significant amount of power loss. Thus, preferred embodiments provide switching fast without dissipating much power.

The body diodes of the MOSFETS 311-314 serve to dissipate current from the inductor L1 in instances when Q1 311 and Q2 313 are turned off. However, these body diodes may have poor reverse recovery charge characteristics. In embodiments, when these body diodes conduct the reverse recovery event may be reduced or eliminated as these reverse recovery events can constitute large portions of switching loses.

The sensing circuit 330 may act to detect the current that is flowing through the inductors. In embodiments, the value of $R_s$ may be small, perhaps 20 m ohms. As shown, the sensing circuit may also include an op-amp or gain amplifier $R_f$ 340, which serves to provide a voltage indicative of the current flowing through the inductors. Two signals, which represent the top and bottom of the voltage, may then be fed to comparators 351 and 352. Signals $B_b$ and $B_t$ fed into these comparators may represent the boundaries for the top and bottom of the voltage. When boundaries are crossed, flip flops may be set and reset to manage the MOSFET switches and the current flowing through the inductors. The signals Q 354 and $\overline{Q}$ 353 may be used to determine if the flip flops are set or reset.

In FIG. 3 the additional gates show how signals $P_c$ and $\overline{P}_c$, which represent the polarity of the current, may be used to control switching signals $q_1$-$q_2$ 382 and $q_3$-$q_4$ 372. These switching signals 382 and 383 may be fed to gate drive circuits 385 and 375. So instructed, the gate drive circuits may then serve to fire the applicable gate node of one or more of the switches 311-314. When the voltage is positive, $P_c$ is set to one and the current $P_c$ may be zero. In embodiments, the duty-cycle boundaries may be set such that when the diodes discharge they may do so without spiking or without heavy noise anomalies.

FIG. 4 shows top and bottom duty-cycle boundaries for almost an entire switching cycle. As can be seen the cycle can last less than 0.02 seconds and the voltage may be positive and ranging from above 3.5 volts to below 1.5 volts. These ranges are exemplary and may vary depending upon the use and particular circuit involved. Here, the voltages have been offset such that 2.4 volts represents zero amps.

In embodiments, varying the top boundaries can serve to determine how much power is delivered to the grid—with the larger the area under the boundary the more power may be delivered. The bottom boundaries may be near zero amps, but are more likely offset in order to clear out charge in the body diodes or other circuit elements providing reverse recovery charges. The cycle speed in this and other embodiments may be on the order to 200 KHz.

Figure 5:
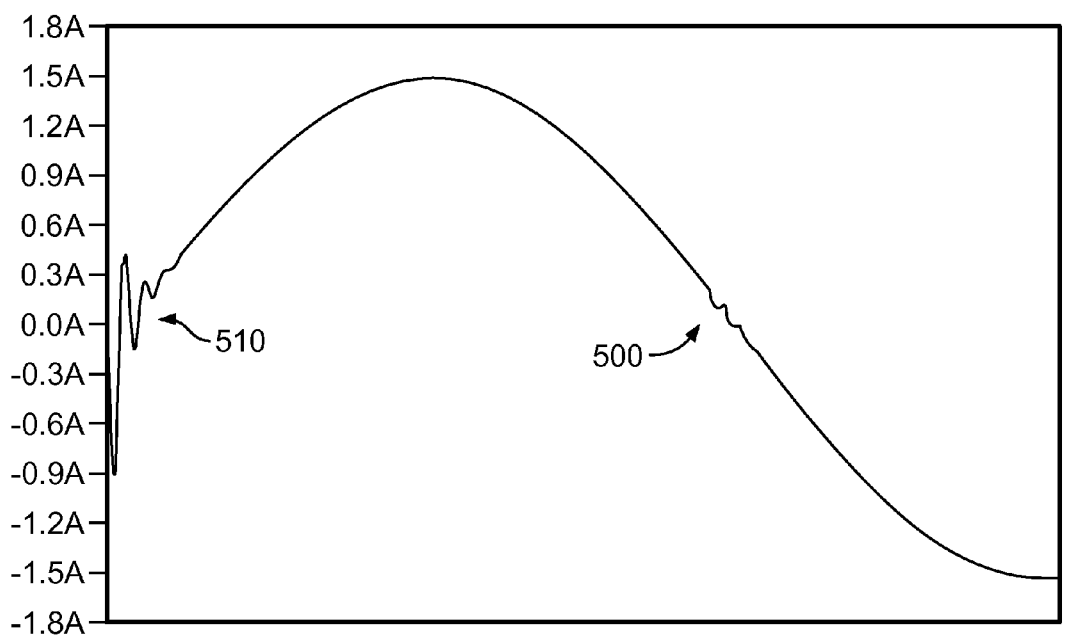
FIG. 5 shows a current signal for an approximate switching cycle as may be rendered in accord with embodiments of the invention.

FIG. 5 illustrates the current output of a power controller circuit controlled consistent with embodiments of the invention. Notably, the boundary parameters from which this current wave was taken employs a variable upper boundary and a fixed lower boundary, such as the boundaries shown in FIG. 4.

Feedback controllers may be employed to provide current outputs consistent with FIG. 5. These controllers may serve to correct for errors such as start up noise 510, and for zero-cross distortions 500, both of which are shown in FIG. 5. In addition to using the feedback circuit to settle the current, all four switches may be pulsed near the zero-crossing to facilitate pushing through that crossing. This pulsing may occur 300 microseconds before and after the zero-crossing. This pulse timing may be selected based upon a percentage of the cycle time. For example, with a 60 Hz cycle waveform, a 300 microsecond lead and lag can represent about 1.8% of a line cycle. In preferred embodiments, this pulsing may have a small impact on efficiency and may have the beneficial effect of reducing distortion at the zero-crossing. In embodiments, the pulsing may occur at different times and for different durations as well. Still further, the pre-crossing pulse may begin 200 microseconds before zero-crossing and the post-crossing pulse may end 350 microseconds after zero-crossing. other pulse times and percentages of cycle time may be employed as well in embodiments.

Figure 6:
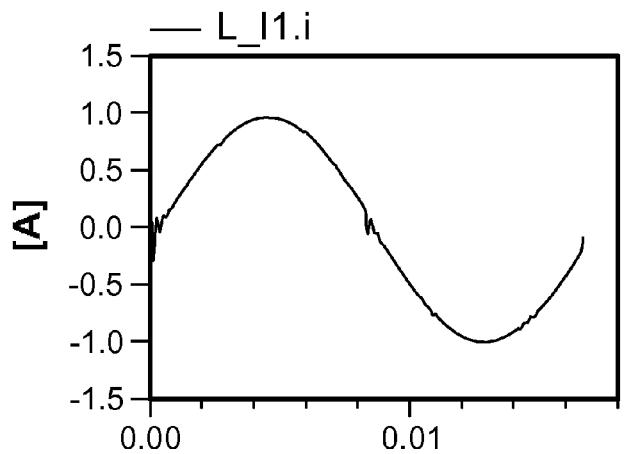
FIG. 6 shows a current signal for an approximate switching cycle as may be rendered in accord with embodiments of the invention.

FIG. 6 shows the corresponding current for the boundaries of FIG. 4, where the current is oscillating between two boundaries at a rate approximately equal to 200 KHz. In FIG. 6, an offset of 0.25 A was employed and peak current was 1.0 A.

Figure 7:
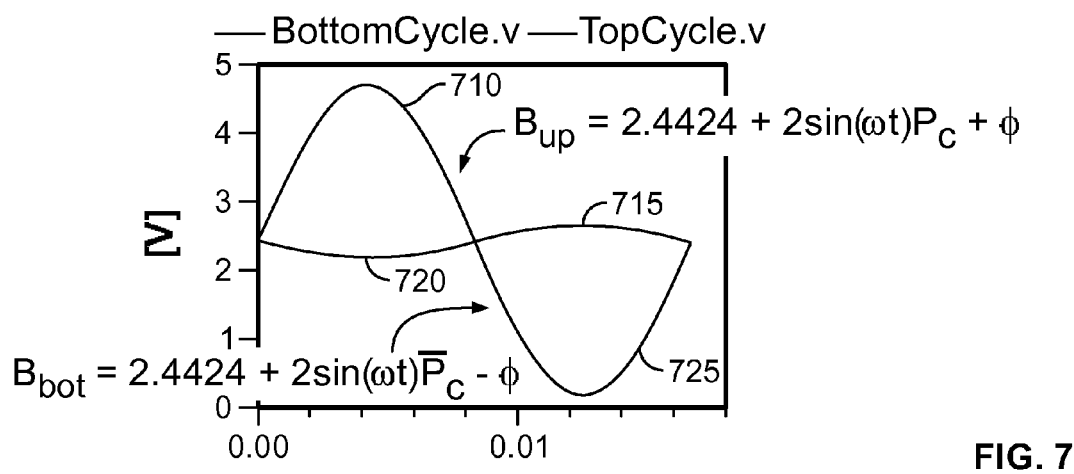
FIG. 7 shows top and bottom voltage boundaries for an approximate switching cycle as may be employed in accord with embodiments of the invention.

FIG. 7 shows top and bottom boundaries where the bottom boundary has a sinusoidal aspect instead of being a constant. In this embodiment the bottom boundary begins and ends at 0.0 and then moves to −0.5 during a cycle. By moving off of zero, clearing out the body diode charge may be accomplished.

As shown in FIG. 7, the top boundary may be defined by the wave $$B_{top}=2.4424+2\sin(\omega t)P_c+O$$

and the bottom boundary may be defined by the wave $$B_{bottom}=2.4424+2\sin(\omega t)\overline{P}_c-O$$

As can be seen, these boundary equations may be shifted by a constant—here 2.4424. This shift constant may serve to provide that current sense amplifiers substantially always or always output positive values, even when the current becomes negative. Accordingly, in embodiments the output of a current sense amplifier may include the sum of a shift constant and the value of the actual sensed current.

Figure 8:
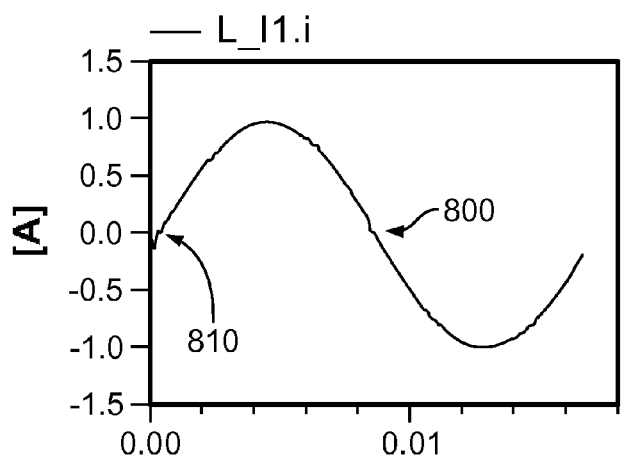
FIG. 8 shows a current signal for an approximate switching cycle as may be rendered in accord with embodiments of the invention.

The upper boundary and the lower boundary can serve to have the effect of reducing switching loss by clearing out reverse recovery charges. In embodiments, variable bottom boundaries may provide for a much smoother transition from positive current to negative current. A smooth transition is shown in FIG. 8. Comparatively, because of the larger area, constant duty-cycle boundaries can serve to ensure that charges are cleared out more thoroughly than with variable duty-cycle boundaries. This more complete clearing of electrical charge can provide for more efficient switching. Comparatively, variable duty-cycle boundaries may provide for smoother output waveforms but not as efficient switching and associated losses.

Embodiments may also include duty-cycle boundaries setting other thresholds. These thresholds can include constant stepped boundaries, where the steps increase or decrease in fixed or variable amounts and the plateaus of the steps may remain constant as well as variable stepped boundaries, where the steps increase or decrease in fixed or variable amounts and the plateaus of the steps may themselves be curved or variable. Still further, the steps in these or other embodiments may be variable and may or may not be uniform. Other modifications to the boundaries, and the thresholds they set, are also possible.

FIG. 8 shows current output where the offset may be adjusted to a constant value of 0.25 and the output peak current is set to 1 A, which are the boundaries shown in FIG. 7. As can be seen, zero-cross distortion 800 and startup distortion 810 may also be adjusted and managed by offsets in the values of the boundaries and adjustments in the peak current settings. Notably, embodiments need not employ feedback controllers to function. The simulation represented in FIG. 8 does not employ such a controller.

Figure 9:
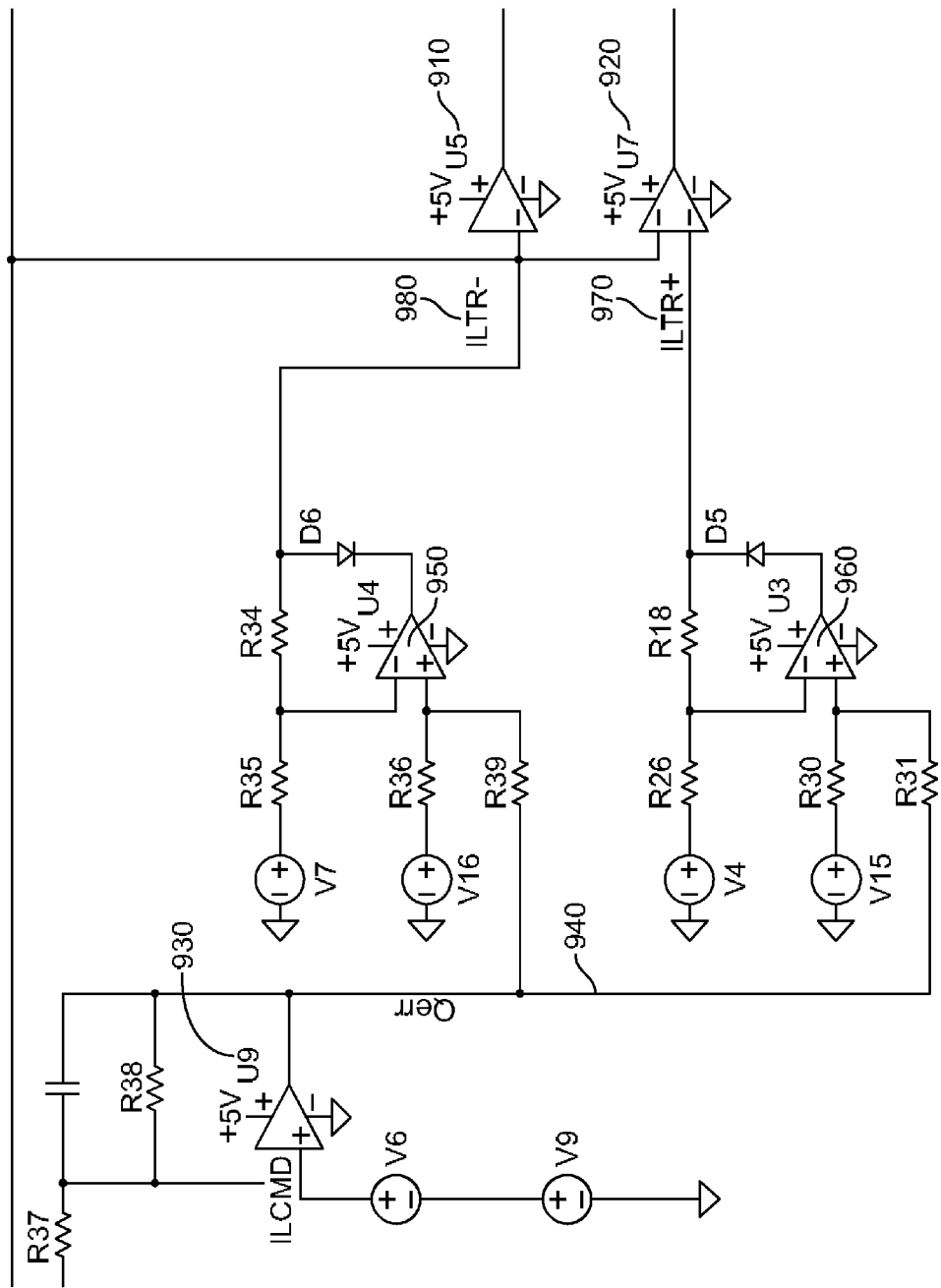
FIG. 9 shows circuitry, including feedback circuitry, as may be employed in accord with embodiments of the invention.

FIG. 9 shows a portion of an exemplary circuit embodying the invention. In FIG. 9, op-amp feedback circuit generates an error signal representing the difference between the desired current and the actual current. Embodiments may or may not include this secondary global feedback circuit as the op-amps U5 and U7 also serve to provide feedback correction in the circuit. The $Q_{err}$ signal signal may then be fed to two parallel op-amps U4 and U3 to implement the boundaries. By using a feedback circuit, discrepancies between desired current and actual currents can be resolved and converged.

Alternatively, the duty-cycle boundaries may be implemented with software and digital converters. Software may be limited because of sampling rates. Nevertheless, if a controller can be configured as such, it may be more advantageous because of price savings associated with software.

In FIG. 9, the op-amps serve as clamps, where the lower op-amp lets an error pass though unless it is negative, in which case the error is set to negative 0.5 amps. The top op-amp may be providing the top boundary. ILTR+ and ILTR− provide signals that represent the top and bottom boundaries. These signals may be sent to op-amps U5 and U7. Thus, the feedback controller is an extension of the duty-cycle boundary features and may or may not be used in embodiments.

Figure 10:
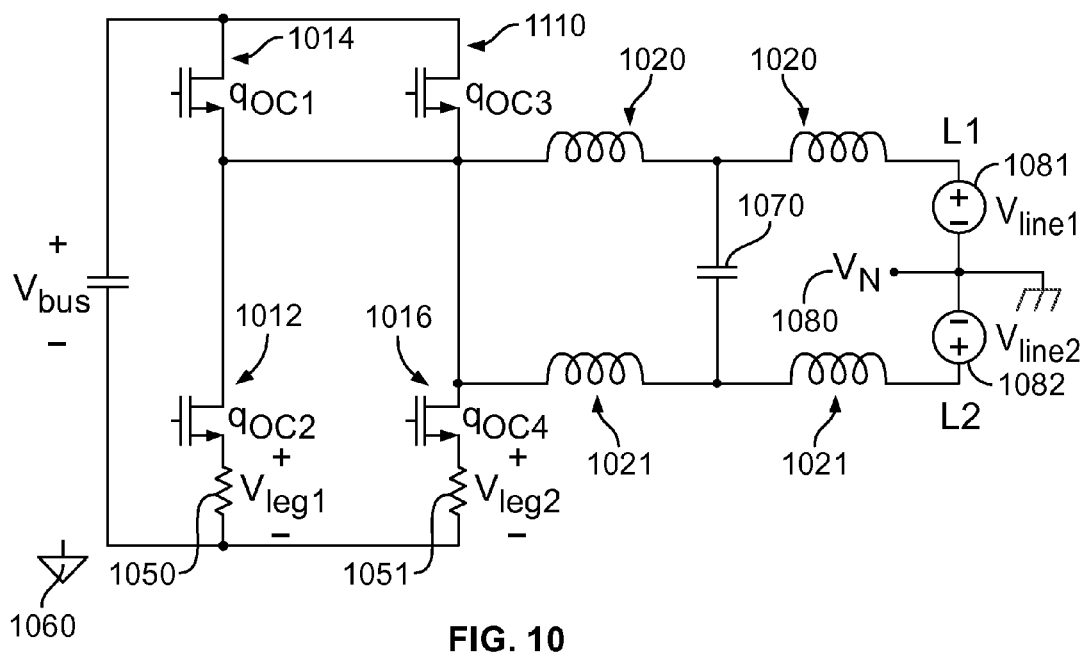
FIG. 10 shows power conversion circuitry using switch side leg sensor resistors as may be employed in accord with embodiments of the invention.

FIG. 10 shows a power circuit inverter including a feedback circuit as may also be used in embodiments. This power circuit includes high-side switches 1110 and 1014, low side switches 1012 and 1016, series inductors 1020 and 1021, capacitor 1070 and split phase voltage system 1081 and 1082. Also shown in FIG. 10 are low-side bus reference sense resistors 1050 and 1051. By using these sense resistors current may be sensed from the common of the DC supply rather than or in addition to sensing form the filter inductors as discussed above. By placing the sensors on the low side of the DC supply, control circuitry may be referenced from the bus. Comparatively, if current is sensed from the filter inductors then high-side or floating sense resistors are preferably used. In embodiments, low-side sensing may be preferred as high side sensing may invoke unwanted noise or require costly components to avoid, especially when small amounts of voltage, on the order of 20 mV or so are provided by the high-side sense resistors from the node that oscillates in the range of 0 VDC to 400 V DC. Nevertheless, embodiments may include high-side buses in their designs. Thus, low-side bus reference sensing may be preferred in embodiments.

The use of sense resistors 1050 and 1051 in each of the MOSFET legs of the dc-ac output stage of FIG. 10 shows that embodiments may include these low-side sense resisters when a common is readily accessible near the switches. As noted, the inductors 1020 and 1022 of the embodiment of FIG. 10 are effectively in series and are coupled to a split-phase voltage system 1081 and 1082. For purposes of circuit analysis, this split-phase system may be considered a single source of double the voltage value.

Figure 11:
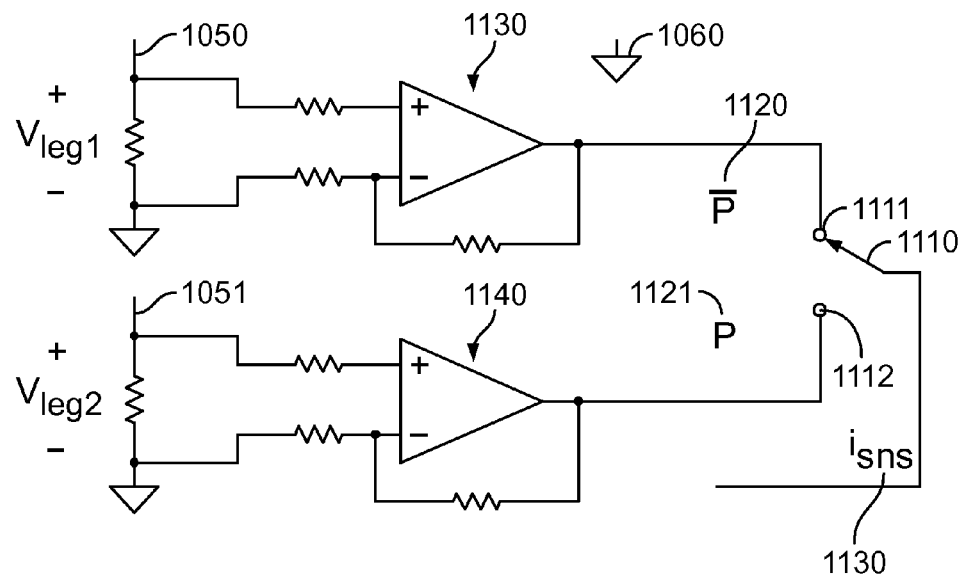
FIG. 11 shows analog multiplexer circuitry as may also be employed with the switch side leg sensor resistors in accord with embodiments of the invention.

FIG. 11 shows that the low-side sense resistor signals may be amplified and multiplexed so as to create a signal $i_{sns}$ representing the absolute value of the line current. This signal may then be compared with a commanded boundary current to control switching logic of the switches. The circuit of FIG. 12 shows one such circuit as to how the $i_{sns}$ signal may be used in controlling switching logic.

In FIG. 11, two differential amplifiers 113 and 1140 are shown and coupled to provide gain to the small sense resistor voltages of sense resisters 1050 and 1051. These sense resistors, i.e., leg resistors, are shown and may be referenced to the bus common. The differential amplifier output may be multiplexed by the analog switch/multiplexer 1110, which is shown toggling between two outputs. The multiplexing may be controlled by logic signals P 1120 and P 1121. As shown, this control and multiplexing produces an $i_{sns}$ value 1130 that represents the absolute value of the line current in the switching block. In use, with a positive current at switch 1016, a proportional voltage may be produced across sensor 1051. This voltage may then be referenced into an applicable current. By alternating between leg resistors 1050 and 1051 the current in the switch block can be synthesized.

Figure 12:
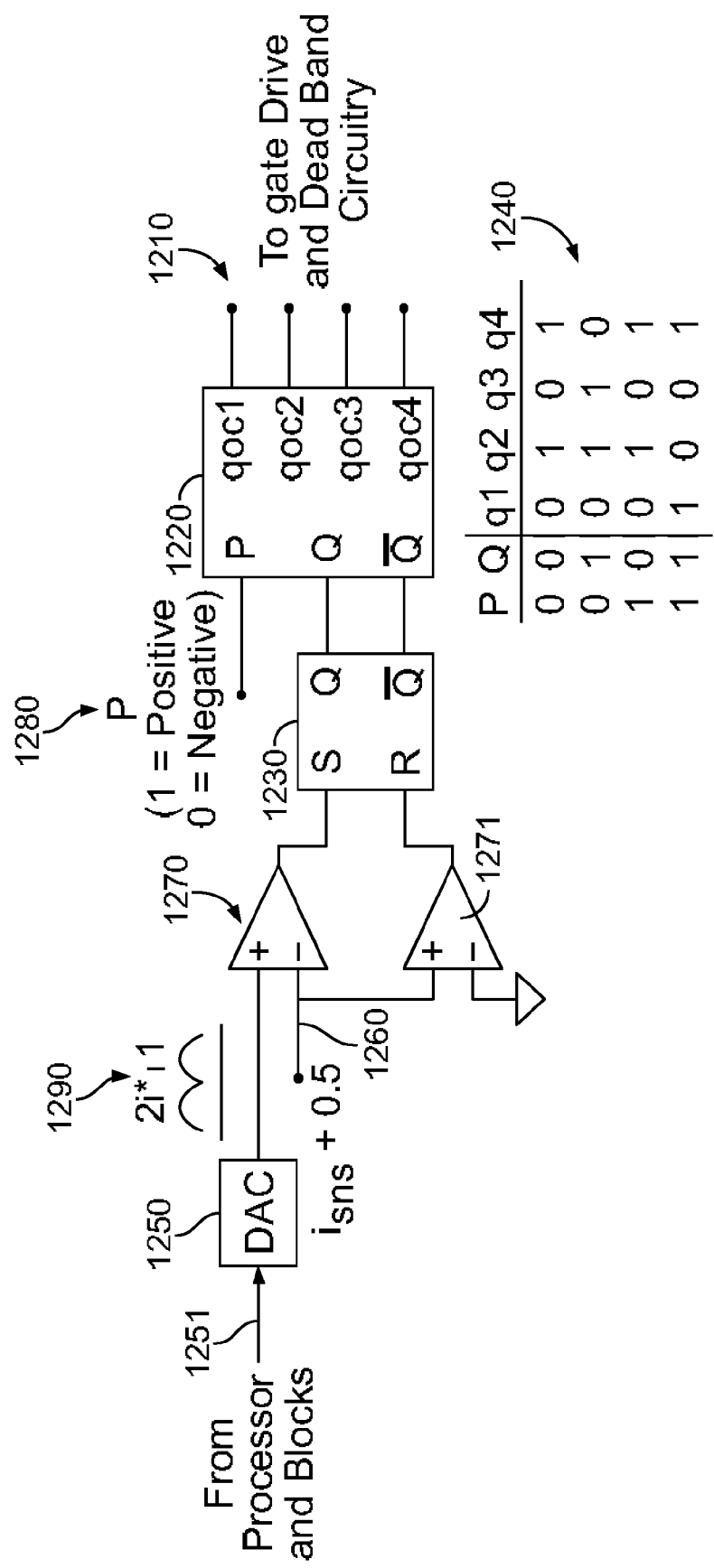
FIG. 12 shows a schematic of circuit logic parameters as may be employed in accord with embodiments of the invention.

FIG. 12 shows embodiments for making the comparison to generate the same switching signals. FIG. 12 uses a set reset flip flop with a truth table. Shown in FIG. 12 is that the sensed current may be shifted up in embodiments (0.5 as shown in this figure) to account for the lower bound (in this circuit, the sensed current +0.5 is compared to zero volts). The upper bound then also has to be shifted by +0.5 to account for the negative lower bound, and then another 0.5 to account for the shift in the sensed value. The comparators produce the switching signal which is set by the SR flip-flop. The switch logic device 1220 may then produce the appropriate switch gating signals consistent with the truth table shown.

FIG. 12 provides a circuit topology showing how a sensed current $i_{sns}$ may be compared to a command current in order to control switch block logic in embodiments. The sensed current $i_{sns}$ may originate in circuits similar to those shown above as well as in other circuit topologies. In the topology of FIG. 12, digital to analog converter 1250 may receive a signal from the processor and blocks. This signal may represent the command current 1290, which is shown as 2i*|1. This command current may be fed to comparator 1270, which may also receive a sensed current signal $i_{sns}$. This sensed current signal may be increased and may be offset by 0.5 to accommodate and provide for the body drain discussed above. The $i_{sns}$ signal may also be fed into comparator 1271 in order to be compared to ground. The outputs of the comparators 1270 and 1271 may be fed to the set-reset flip flop 1230. This flip flop may itself be coupled to a switch logic device 1220, which also has logic signal P as an input. The switch logic device may generate output drive signals for switches $q_{oc1}$-$q_{oc4}$ depending upon the logic state of P and Q. The flip flop truth table 1240 provides the logical output for the logic device 1220 depending upon the inputs.

In operation, when the comparators detect that the command current threshold or the low side thresholds are crossed, signals may be sent to the SR flip flop 1230 to provide the needed logic for controlling the switches by the switch logic device. As upper threshold are met, alternate switches may be thrown to reverse the current and maintain it within the thresholds. Likewise, when the bottom threshold is met, the switch logic may be reversed such that current will rise against towards the upper threshold. This containment between the thresholds, while also crossing a zero-volt setting can serve to reduce body diode losses. Still further, in embodiments, rather than using a fixed 0.5 adjustment to the $i_{sns}$ current, a variable benchmark may be used as well. This variable benchmark may serve to smooth zero-transition noise as the current and voltage cycle from positive to negative.

In further embodiments, the boundary references, comparison, and subsequent gating control may also be performed by software. The software may sample the applicable voltage sensor, determine the applicable current, compare that current to a threshold and generate signal for use by a switching gating control. When sampling rates are high, software may not be preferred as it may not be able to render signals at that speed. However, when cycle rates are lower, software comparators may be preferred to simplify the circuit design.

Figure 13:
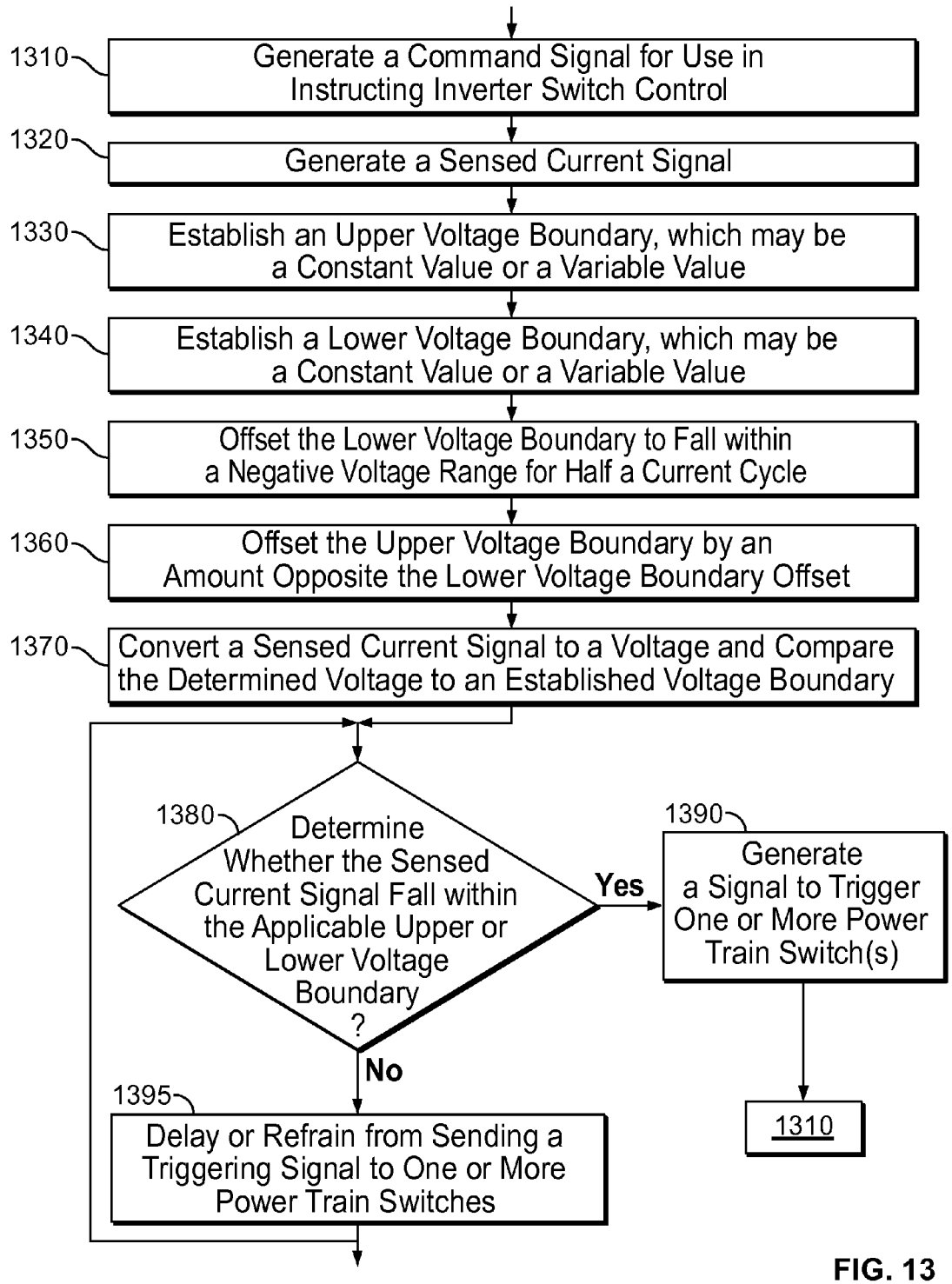
FIG. 13 provides features as may be individually or cumulatively employed in processes in accord with embodiments of the invention.

FIG. 13 provides features or processes as may be employed with embodiments. These features and processes may be employed as described and in variants as well. The features and processes may be performed in the presented order, in different orders, and with more or less than the features and processes provided. In other words, some features or processes may be added and others may be skipped or used elsewhere in embodiments.

As can be seen in FIG. 13, embodiments may include generating a command signal for use in instructing or controlling inverter switch control. The inverter switch control may be consistent with discussions above, including using the logic tables provided in FIG. 12 and implicitly provided in FIG. 3.

As can also be seen in FIG. 13, a process in embodiments may also include generating a sensed current signal as shown at 1320, establishing an upper voltage boundary, as shown at 1330, and establishing a lower voltage boundary, as shown at 1340. Consistent with discussions above, the upper voltage boundary may be a constant value or a variable value. Likewise, the lower voltage boundary may also be a constant value or a variable value.

As shown in FIG. 4, as current alternates back and forth, the upper and lower voltage boundaries may switch from being a variable threshold to being a constant threshold. The variables used for these duty-cycle boundaries, may include the formulas identified and described above. For example, these can include the formulas shown in FIG. 7, as well as those identified in the text above. Other formulas may also be used.

In embodiments, as shown in FIG. 13, the lower voltage boundary may be offset such that it falls below and becomes negative for approximately half a cycle. This offset may be a constant, as well as a variable. In preferred embodiments the offset will be a constant value. Likewise, the upper value may also be offset opposite to and in response to the offset for the lower boundary. By creating equal and opposite duty-cycle boundary offsets the output currents can remain within expected values.

As explained at 1350, because the current is swinging between positive and negative values, the offsets may be considered to apply within each cycle. In other words when the measure voltage is negative, the lower boundary may be a constant, and may be offset by another constant value. Conversely, when the voltage swings positive and the current is negative, that upper boundary may now be considered to be a constant and the offset also a constant value. In embodiments the absolute values may be considered when determining and establishing offsets.

As explained above, the offsets and the boundaries may be set such that inverter switching losses may be minimized. In embodiments, resident voltage charges associated with reverse recovery charges, may dissipate or be reduced through the introduction of switching delays, and/or through the use of certain switch timing.

As shown at 1370, the sensed current signal may then be compared to the established voltage boundaries when the upper boundary is applicable, and to an established lower boundary, when the lower boundary is applicable. This determination is shown at 1380.

As shown at 1390, if the determination reveals that the signal falls within the applicable boundary, then one or more powertrain switches may be triggered in the circuit. Conversely, if the sensed current signal falls outside of the applicable boundary, then no triggering signals for the MOSFET or other powertrain switches may be sent. As shown in FIG. 13, the process may begin again at 1310 or remain in a sensing loop at 1395. Embodiments may contain other steps or features as well.

Figure 14:
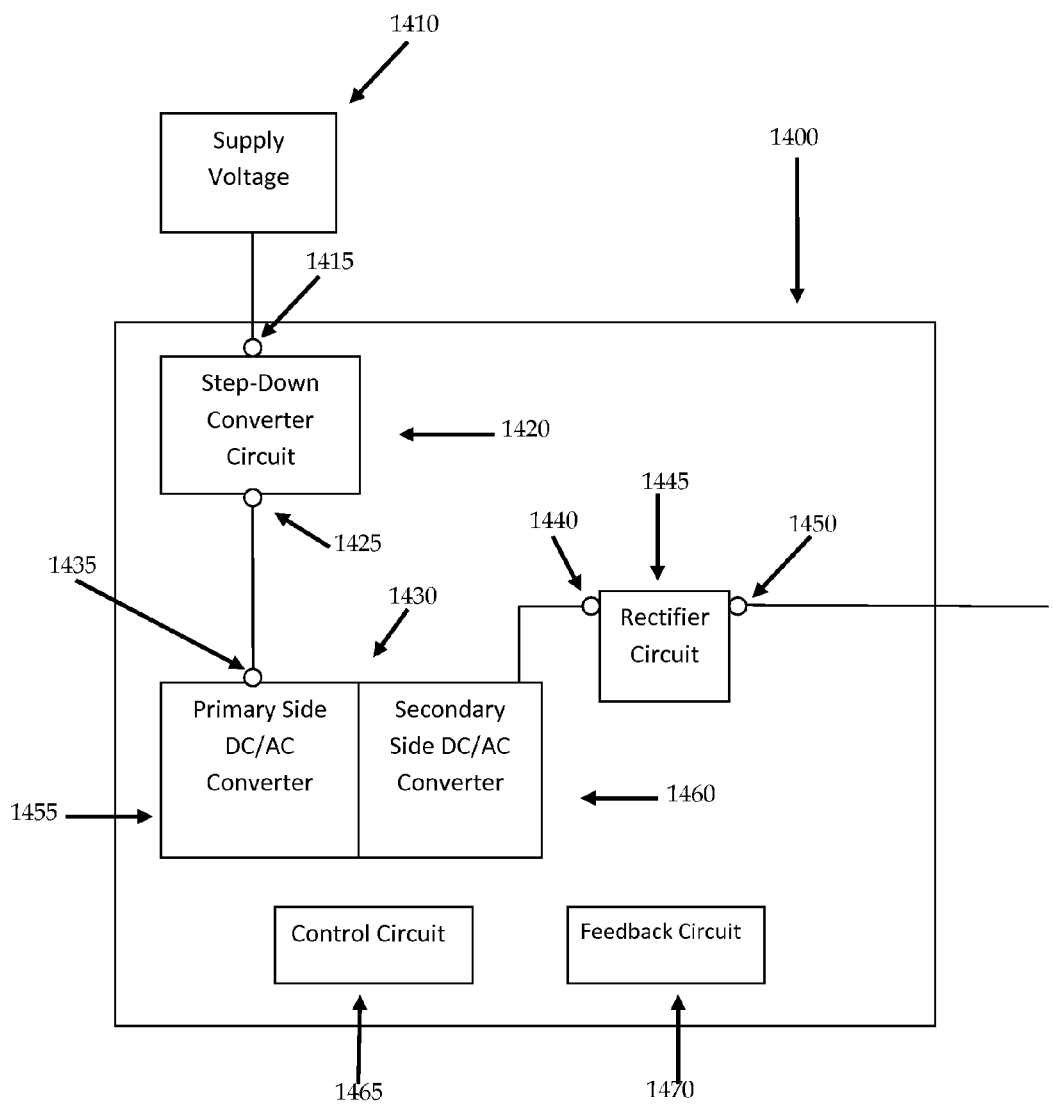
FIG. 14 shows topology of a power converter in accord with embodiments of the invention.

FIG. 14 shows topology of a power converter 1400 comprising a step-down converter circuit 1420 of switching type having an input port 1415 to couple to a supply voltage 1410 and having an output port 1425 to provide an output voltage at a magnitude that is lower than a magnitude of the supply voltage. The converter also comprises a control circuit 1465 configured to receive a feedback signal and regulate the magnitude of the output voltage in response thereto and a DC/AC converter circuit 1430 of switching type having a primary side 1455 and a secondary side 1460, the primary side having an input port 1435 coupled to the output port 1425 of the step-down converter circuit 1420. The secondary side 1460 also has an output port to provide an AC output voltage. Still further, the converter also comprises a rectifier circuit 1445 having an input port 1440 and an output port 1450, the input port being coupled to the secondary side 1460 of the DC/AC converter circuit 1430, the output port 1450 supplying a DC voltage and a feedback circuit 1470 to generate the feedback signal in response to the output port of the rectifier circuit.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A power converter comprising:
   a DC/AC converter circuit of switching type comprising four switches coupled to receive input voltage and configured to provide an AC output voltage; and
   a control circuit configured to sense an output current of the DC/AC converter and generate a command signal to trigger one or more of the switches when the sensed current falls within an upper voltage boundary and a lower voltage boundary.

2. The power converter of claim 1 wherein the upper boundary is a value that varies over time and the lower value is a constant.

3. The power converter of claim 1 wherein a switch in the DC/AC converter circuit is delayed in switching for a duration that provides for the dissipation of accumulating charge associated with the switch, before the switch is switched.

4. The power converter of claim 1 wherein switches receive switching signals that alternately switch a first pair of switches on and off, independently switch a third switch on and off, and hold open a fourth switch.

5. A method of operating a circuit using variable duty cycle switching and imposed switching delay comprising:
   generating a command signal for use in instructing inverter switching control of a circuit;
   generating a sensed current signal for the circuit;
   converting the sensed current signal of the circuit to a determined voltage;
   determining whether the determined voltage falls within an applicable range of voltage boundaries; and if the determined voltage is within the applicable range of voltage boundaries, generating a signal to trigger one or more power train switches of the circuit; and if the determined voltage is not within the applicable range of voltage boundaries, delaying from sending a triggering signal to one or more power train switches of the circuit.

6. The method of claim 5 wherein the applicable range comprises an upper voltage boundary with a constant value and a lower voltage boundary with a variable value.

7. The method of claim 5 wherein the applicable range comprises an upper voltage boundary with a variable value and a lower voltage boundary with a variable value.

8. The method of claim 5 wherein the applicable range comprises an upper voltage boundary with a variable value and a lower voltage boundary with a constant value.

9. The method of claim 5 wherein the delay from sending a triggering signal serves to dissipate resident reverse recovery voltage charges.

10. The method of claim 5 wherein the delay from sending a triggering signal provides dead time for latent electrical charges in antiparallel diodes in the circuit to dissipate.

11. The method of claim 5 wherein the delay from sending a triggering signal to one or more power train switches provides dead time for latent electrical charge impediments in the circuit to dissipate.

12. A method of reducing latent electrical charges in a power train comprising:
    providing an electrical circuit with a power train for converting dc current to ac current;
    determining if a measured voltage in the electrical circuit is at or within a first boundary; and
    managing the timing of switch activation in the electrical circuit, wherein dead-time for one or more switches of the power train is introduced into the firing sequence of the switches of the power train, the dead-time serving to dissipate latent electrical charge resident in the power train of the electrical circuit.

13. The method of claim 12 wherein the latent electrical charge is resident in a switching diode.

14. The method of claim 12 wherein the latent electrical charge is resident in an anti-parallel diode of a switch in the power train.

15. The method of claim 12 further comprising:
    determining if the measured voltage in the electrical circuit is at or within a second boundary, the first boundary being a variable upper boundary varying with commanded current and the second boundary being a lower constant value.

16. The method of claim 12 further including dampening the output of the switches of the power train using a combination of one or more inductors and capacitors as a third order filter.

17. The method of claim 12 wherein the power train is an H-bridge switching circuit and the firing sequence holds open a fourth switch of the switches in the H-bridge while firing a first and second switch in the H-bridge and independently firing a third switch in the H-bridge power switching circuit.

* * * * *